Jan. 11, 1966 D. BUCCICONE 3,228,682
VACUUM BELT-TYPE CONVEYOR
Filed May 13, 1963 7 Sheets-Sheet 6

INVENTOR.
Dario Buccicone,
BY
Triest, Lockwood, Grunawalt & Dewry.
ATTYS

United States Patent Office 3,228,682
Patented Jan. 11, 1966

3,228,682
VACUUM BELT-TYPE CONVEYOR
Dario Buccicone, Gary, Ind., assignor to Buccicone Engineering Co. Inc., Gary, Ind., a corporation of Indiana
Filed May 13, 1963, Ser. No. 279,798
13 Claims. (Cl. 271—74)

This invention relates to article conveyors and is more particularly concerned with improvements in an overhead conveyor which employs suction for holding sheets or similar articles against the bottom surface of a traveling belt.

Conveyors have heretofore been developed for handling sheets or similar articles in which the articles are held in engagement with the bottom surface of a traveling belt by suction applied through openings in the belt. One such conveyor is described in my Patent No. 2,973,960, dated March 7, 1961, wherein the bottom run of the traveling belt covers the open face of a suction box and the openings in the belt are automatically opened as the sheets are engaged with the bottom surface of the belt and advanced along the same so that the sheet is held in engagement with the bottom surface of the belt by suction applied through the openings. In the prior apparatus a mechanism is provided for restoring the displaced belt members when the sheet is advanced to a predetermined point to close the openings and cut off the vacuum, thereby to release the sheet for deposit beneath the conveyor. While this and similar conveyor apparatus has operated successfully, it has been recognized that there is some disadvantage in relying upon the pressure of the article or sheet against the surface for opening the air passageways in the belt so as to make the vacuum effective. Therefore, it is an object of the present invention to provide a vacuum belt-type conveyor wherein the apertures forming the air passageways in the vacuum belt are normally closed and mechanism is provided for automatically opening the apertures in timed relation to the advance of the article without relying upon pressure of the article against the belt.

It is a more specific object of the invention to provide in a conveyor of the type described an endless traveling belt which is supported on spaced end pulleys with its lower run traveling beneath an apertured vacuum chamber, the belt having slit-like openings which are normally closed and which are adapted to be opened so as to form passageways through which suction is applied to an article to hold the articles on the conveyor for advancing movement with the belt, and a mechanism for applying pressure at spaced points along the path of the belt so as to control the application of suction to the article which mechanism is operated in timed relation to the movement of the article as it is advanced into engagement with the lower surface of the belt, without regard to the pressure applied by the article against the belt.

It is another object of the invention to provide an overhead conveyor which comprises a supporting frame, an article carrying belt having a plurality of longitudinally spaced, slit-like openings which are normally closed, the belt being mounted on spaced end pulleys with its lower run traveling beneath an apertured vacuum chamber, and a plurality of pressure applying devices within the chamber which are movable into and out of engagement with the back surface of the belt so as to effect opening and closing movement of the apertures in the belt together with control mechanism for actuating successive pressure applying devices in timed relation to the advancing movement of an article beneath the lower run of the belt so as to successively open the apertures in the belt to make the vacuum effective for holding the article on the belt and for automatically closing the apertures so as to release the article when the article has reached a predetermined position.

A further object of the invention is to provide an overhead conveyor of the type described having a locking mechanism for rendering inactive a predetermined number of the pressure applying devices so as to hold the belt with the apertures closed and the vacuum ineffective.

It is a still further object of the invention to provide an overhead conveyor which comprises a supporting frame, an article carrying belt having a plurality of longitudinally extending, slit-like openings which are closed in the normal condition of the belt, the belt being mounted on spaced end pulleys with its lower run traveling beneath a vacuum chamber, and a plurality of pressure applying roller devices within the chamber which are eccentrically mounted so as to be movable into and out of pressure applying engagement with the back surface of the belt to open and close the apertures in the belt together with control mechanism for normally holding the pressure applying devices in engagement with the belt, which mechanism is operable to release successive pressure applying devices in timed relation to the advancing movement of an article beneath the lower run of the belt thereby to relieve the pressure on the belt and successively open the apertures in the belt to make the vacuum effective for holding the article on the belt.

These and other objects and advantages of the invention will be apparent from a consideration of the conveyor apparatus which is shown by way of illustration in the accompanying drawings wherein:

FIGURE 13 is a partial cross section taken on the line 13—13 of FIGURE 10, to an enlarged scale;

FIGURE 14 is a cross section taken on the line 14—14 of FIGURE 11, to an enlarged scale and with portions broken away;

Figures 1, 1A, 1B:
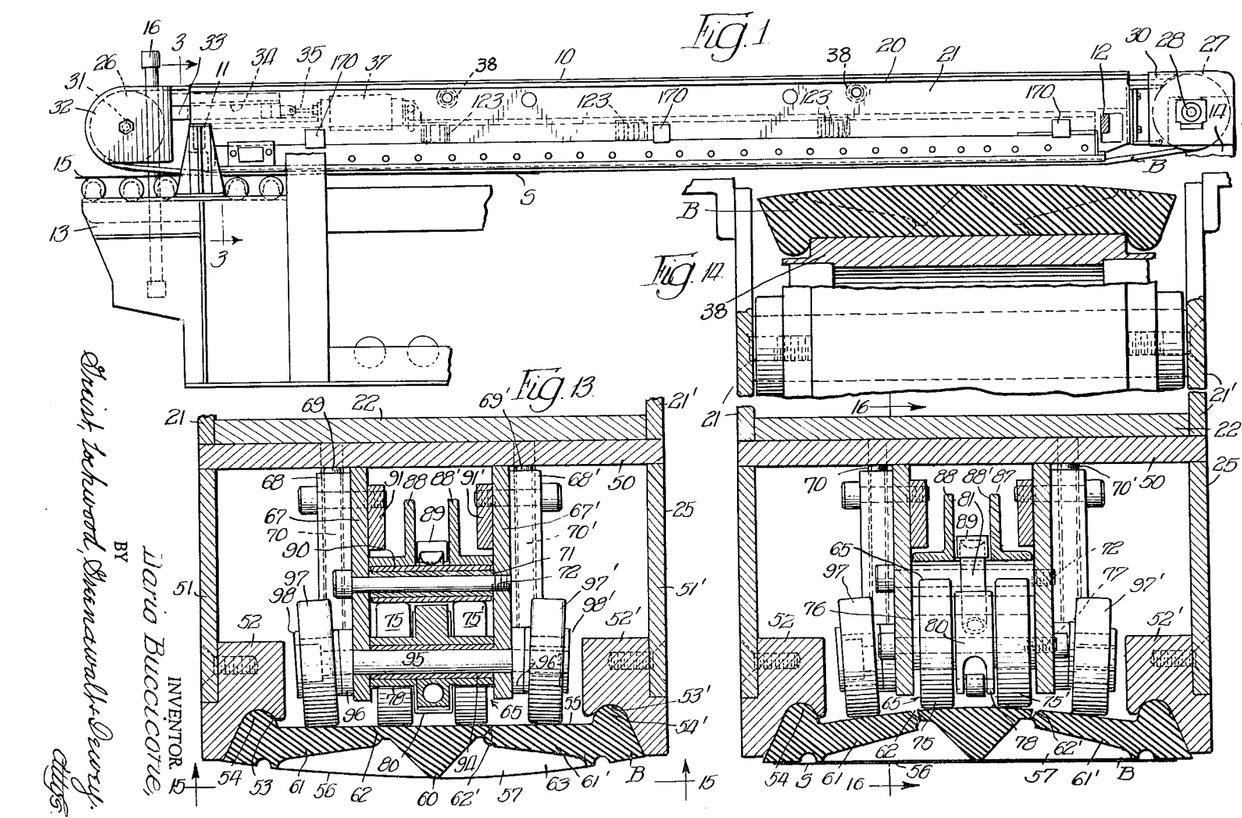
FIGURE 1 is a side elevation of a sheet piling apparatus having an overhead conveyor which embodies therein the principal features of the invention, with portions of the apparatus being broken away or omitted.
Figure 2:
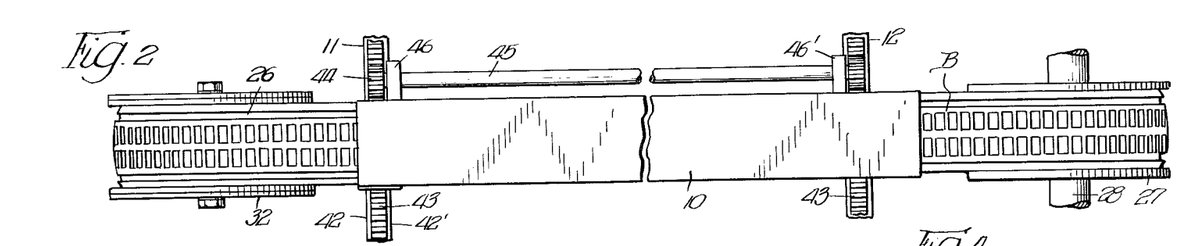
FIGURE 2 is a partial plan view of the apparatus, to an enlarged scale, and with portions broken away or omitted.

In FIGURES 1 and 2, there is illustrated a portion of a sheet handling apparatus which includes a rail-type overhead conveyor unit or assembly 10 having embodied therein the principal features of the invention. The apparatus illustrated is particularly adapted for handling sheets of relatively light weight material such as aluminum. It may be employed also to handle any other similar articles such as rigid plastic, copper, brass, stainless steel, cold rolled steel sheets, etc.

The conveyor rail unit or assembly 10 is supported at its opposite ends on cross beams 11 and 12 which are in turn supported on end stands 13 and 14. While only one conveyor unit 10 is shown, it will be apparent that several could be supported side-by-side on the same cross beams 11 and 12, the number depending upon the width of the sheets or other articles to be handled. A feeding conveyor (not shown) will be provided to deliver the sheets S or other articles to the underside of the conveyor unit 10, the sheets entering the apparatus on a roller bed 15 on the end stand 13. The sheet S passes over the roller bed 15 and its leading edge engages with the downwardly facing bottom surface of the conveyor unit 10. A photocell or other switch forming device 16 which is actuated by passage of the sheets S is adjustably mounted at the infeed end of the machine and connected into an electrical control circuit for operating the mechanism. The apparatus, when employed as a sheet piler, will include an end stop mechanism and a back stop, neither of which is shown since they form no part of the present invention.

The conveyor unit or assembly 10, as illustrated in FIGURES 1 to 17, comprises a main frame 20 consisting of vertically disposed, laterally spaced side plates 21 and 21' (FIGURES 1, 13 and 14) which are connected at their bottom edges by a cross plate 22 welded or otherwise secured thereto. A suction box and belt guiding assembly 25 is secured on the lower face of the frame 20 intermediate the ends thereof and a belt B is supported and guided along its lower run on the lower face of the box 25. The belt assembly B is supported at opposite ends of the conveyor frame 20 on pulley formations 26 and 27. The pulley formation 27 at the outfeed or discharge end of the conveyor is mounted on a cross shaft 28 in a housing 30 which is fixed on the end of the frame 20 and the shaft 28 is connected to a suitable power drive (not shown). The pulley formation 26 at the infeed end of the conveyor is mounted on a cross shaft 31 in a horizontally movable housing 32. The housing 32 has a mounting stem 33 which is slidably received in a guideway formation 34 in the end of the frame 20 and is pivotally connected to the piston 35 of a fluid cylinder 37 which is pivotally connected at its base to the frame 20 so that by controlling the pressure in the cylinder 37 tension in the belt assembly B may be controlled. The top run of the belt B is carried on support rollers 38 journaled between the side frame plates 21 and 21'.

Figure 3:
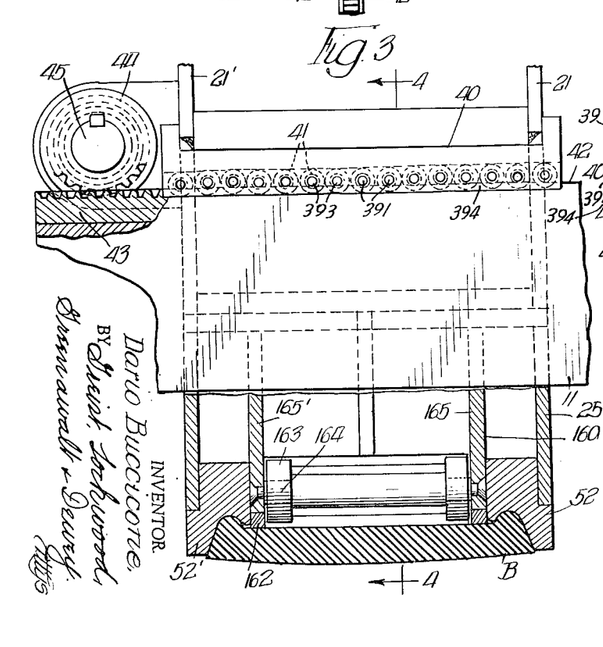
FIGURE 3 is a partial section taken on the line 3—3 of FIGURE 1, to an enlarged scale.
Figure 4:
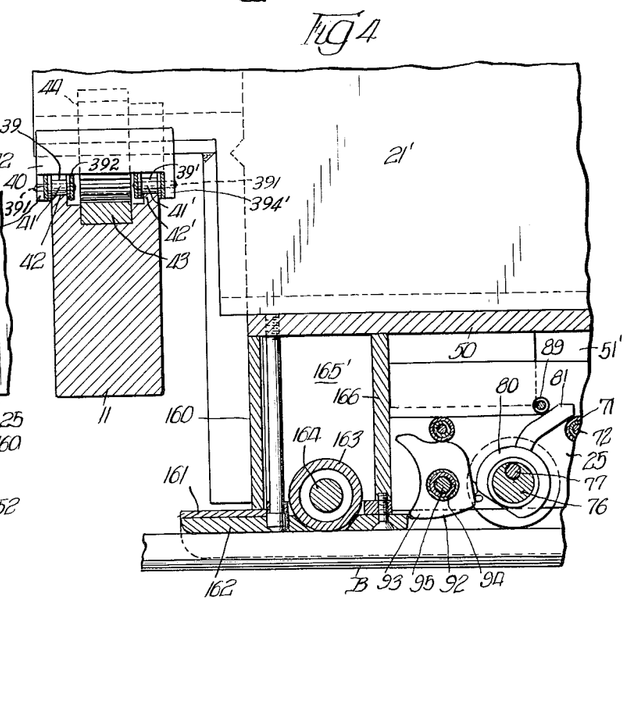
FIGURE 4 is a partial section taken on the line 4—4 of FIGURE 3.
Figure 5:
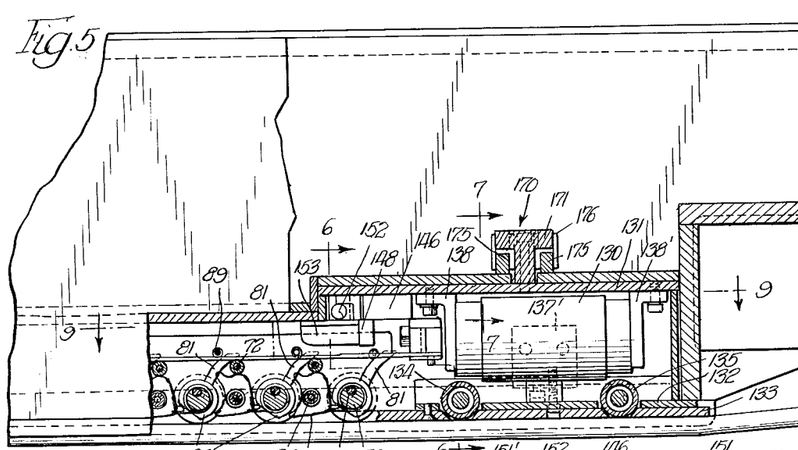
FIGURE 5 is a fragmentary side elevation at the discharge end of the conveyor, to an enlarged scale and with portions thereof broken away.
Figure 6:
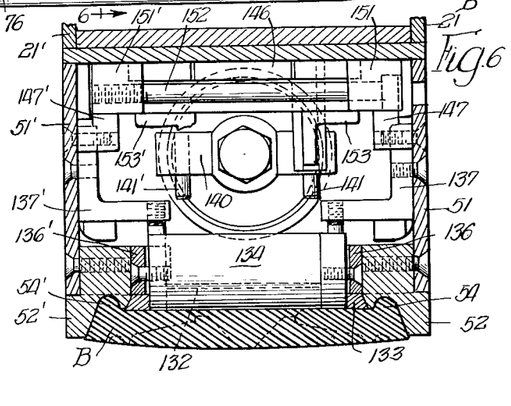
FIGURE 6 is a cross section taken on the line 6—6 of FIGURE 5, to an enlarged scale.
Figure 7:
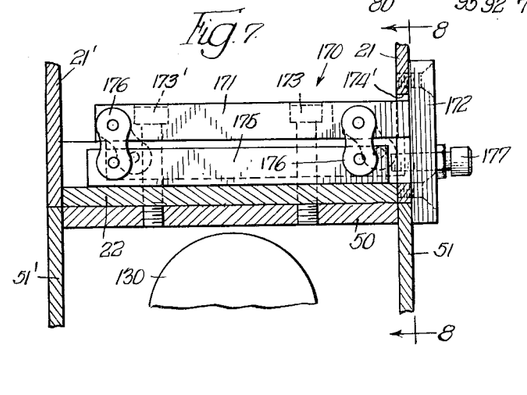
FIGURE 7 is a fragmentary cross section taken on the line 7—7 of FIGURE 5, to an enlarged scale.
Figure 8:
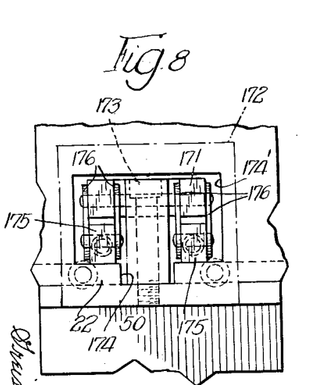
FIGURE 8 is a fragmentary side elevation taken on the line 8—8 of FIGURE 7.
Figure 9:
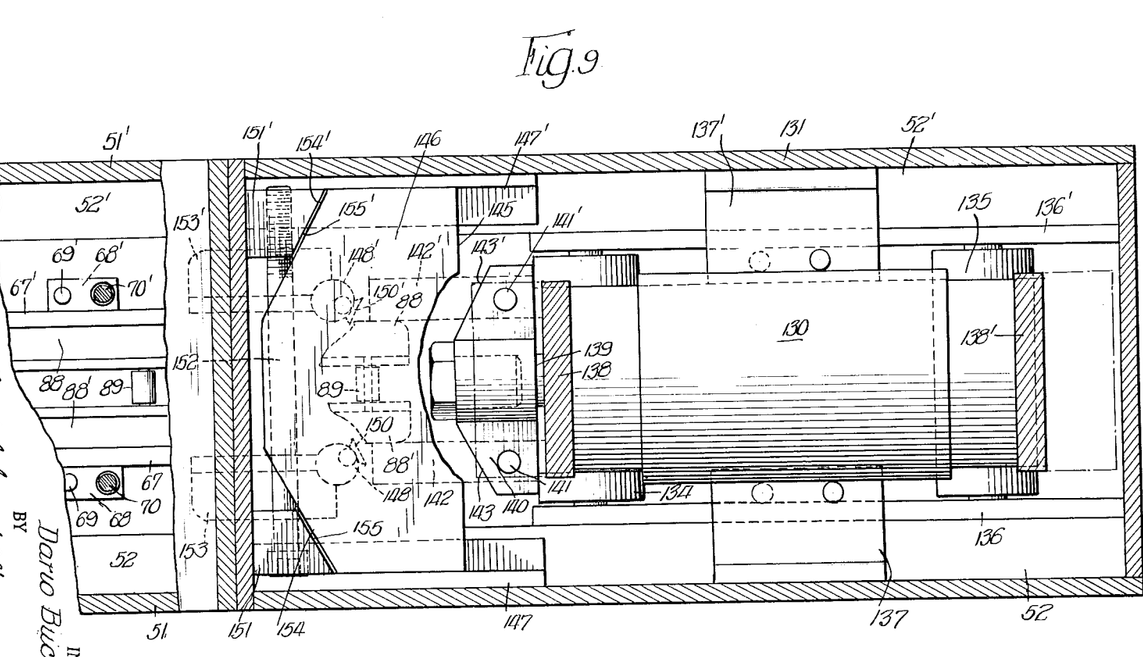
FIG. 9 is a fragmentary, horizontal section taken on the line 9—9 of FIGURE 5, to an enlarged scale.

The conveyor 10 is mounted on the cross beams 11 and 12 so as to be adjustable laterally on the end frames 13 and 14. As shown in FIGURES 3 and 4, the side plates 21 and 21' have cut out portions at the entry end of the conveyor and a cross bar member 40 extends between the plates 21 and 21'. The cross bar 40 has a downwardly opening recess in its bottom face in which a pair of parallel spaced lengths of chain 41 and 41' of well known construction are mounted. The supporting cross bar 11 (FIGURES 2, 3 and 4) has a longitudinally extending recess in its top face which provides parallel upwardly projecting rail-like guides 42 and 42' on which the lengths of chain 41 and 41' rest so that the frame 20 is supported on the spacer rollers or sleeves 39 on the pivot pins 391 which connect the pairs of chain plates 392 to form the chain links in well known fashion. The pivot pins 391 are extended at one end as shown in FIGURES 3 and 4 into socket forming bores 393 in the depending wall portions 394 and 394' of the cross bar member 40 to anchor the chains the full length of the cross bar member. The chains 41 and 41' serve as anti-friction support members, enabling the unit 10 to be easily moved for lateral adjustment. A rack 43 is set in the recess in the top of the cross bar support 11 for engagement by a pinion 44 mounted on the end of a shaft 45 which is supported at opposite ends of the frame 20 in bearings 46 and 46' and which extends parallel with the longitudinal axis of the frame 20. A like arrangement is provided at the other end of the frame 20 in connection with the cross bar support 12 so as to insure equal movement of the two ends of the conveyor unit 10 during lateral adjustment thereof.

The vacuum box 25 is formed, preferably, in several sections which are connected together in longitudinal alignment and the box assembly is then clamped to the lower face of the bottom plate 22 of the main frame 20 in a manner which will be described. The suction box 25 provides a vacuum forming chamber which is connected to a vacuum line or pump (not shown) with its ends sealed and its lower face closed by the belt assembly B. The vacuum box 25 (FIGURES 4, 5 and 13) comprises a top plate 50 and a pair of depending, parallel side plates 51 and 51'. Longitudinally extending guide members 52 and 52' are mounted on the bottom margins of the side plates 51 and 51' and recessed at 53 and 53' to provide guide forming grooves for the rib-like side edge formations 54 and 54' of the belt assembly B.

The belt assembly B is formed so that in one condition or one form thereof it provides an imperforate closure for the otherwise open lower face of the vacuum box 25 while in another condition thereof slits, which extend through the belt, are opened up and form vacuum passageways between the inside and outside faces thereof. The belt assembly B is shown in its closed position in FIGURE 13 and in its open position in FIGURE 14. As shown in FIGURE 13, the top or inside surface is recessed and forms a planar surface 55 terminating at opposite edges in the rib formations 54 and 54' of semicircular cross section which seat in the guide recesses or grooves 53 and 53' in the members 52 and 52'. The outside face 56 of the belt assembly B is provided with longitudinally spaced, transverse slots or recesses at 57 which divide the belt into a center section 60 of generally triangular cross section and two side sections 61 and 61'. Slits 62 and 62' are formed in the bottom portions of the recesses 57 and extend in diverging relation toward the inner or back face of the belt B. The transverse recesses 57 are separated by rib forming portions 63, the outer edges of which cooperate with the outermost edge of the center section 60 to define the lower or outer surface of the center portion of the belt. The belt is so proportioned and the slits 62 and 62' are arranged so that when the normally bowed outermost face 56 of the belt is flattened the slits 62 and 62' open up as shown in FIGURE 14 and provide passageways between the outside or bottom surface of the belt B and the vacuum forming chamber in the box 25.

Figure 10:
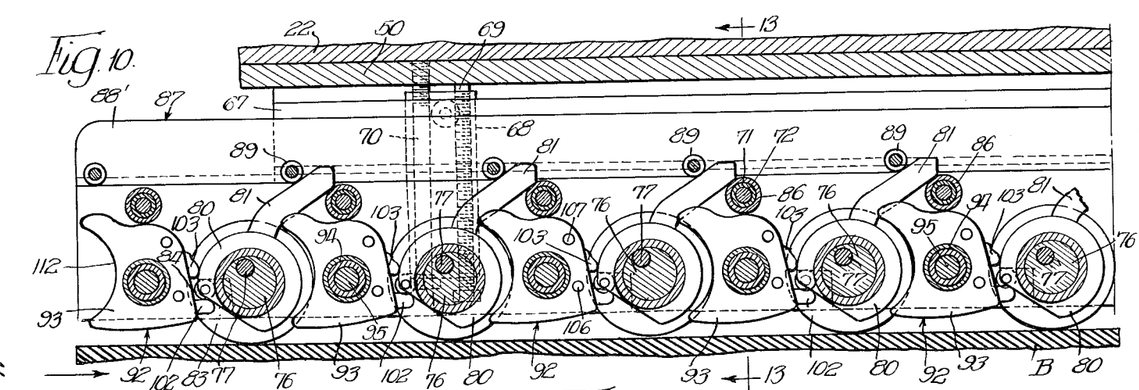
FIG. 10 is a partial, longitudinal, vertical section illustrating a portion of the belt opening and closing control mechanism at the entrance end of the conveyor, the mechanism being shown in the closed position of the belt.
Figure 11:
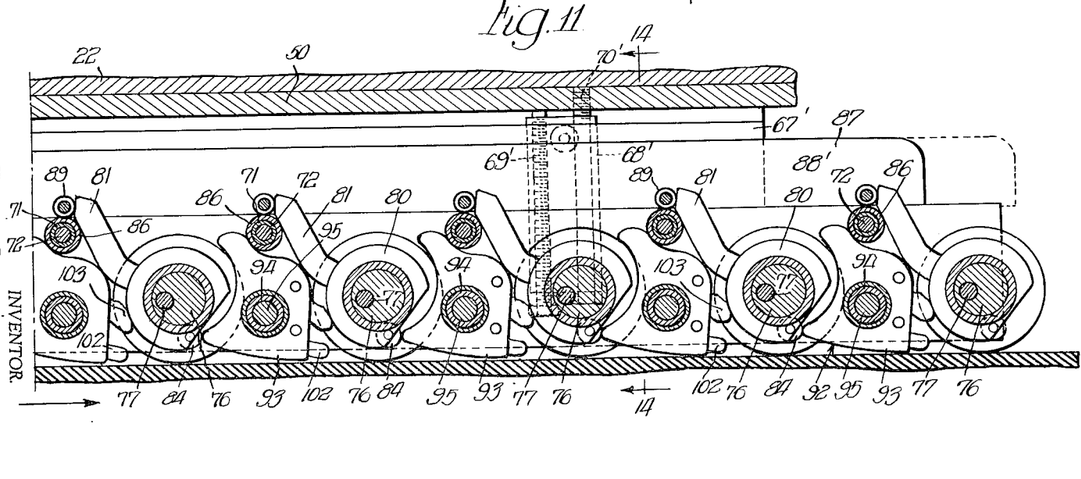
FIGURE 11 is a partial, longitudinal, vertical section showing another portion of the belt opening and closing control mechanism at the discharge end of the conveyor, the apparatus being shown in the open position of the belt.
Figure 12:
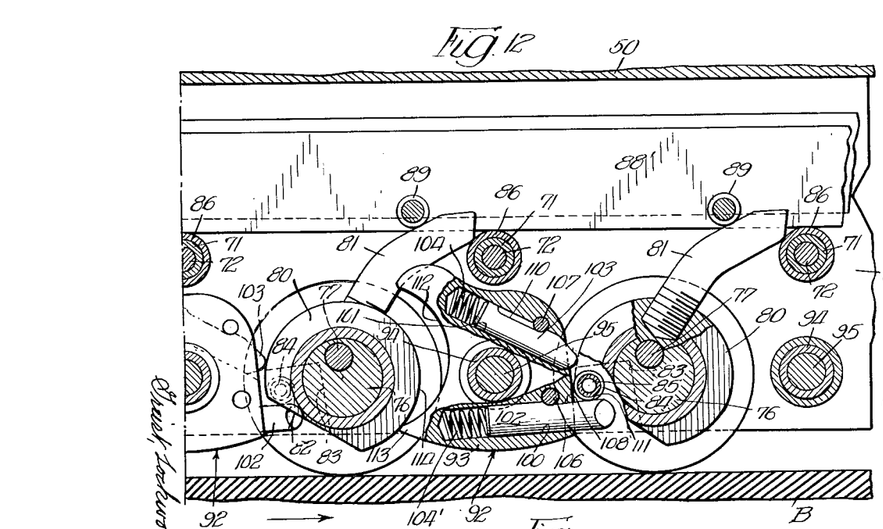
FIGURE 12 is a fragmentary, longitudinal, vertical section, to an enlarged scale, showing one of the belt opening and closing cams and associated control member, with portions thereof broken away.
Figure 15:
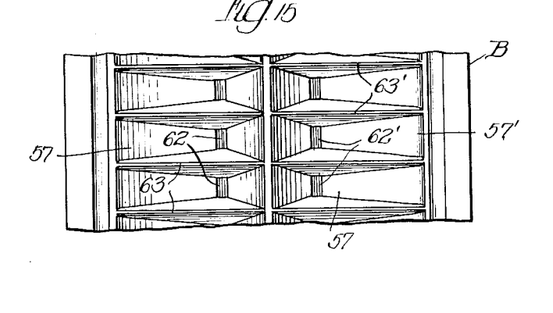
FIGURE 15 is a fragmentary plan view showing a portion of the exposed lower face of the belt.

The opening and closing of the slits 62 and 62' in the belt B is controlled through pressure on the belt faces 55 and 56. Pressure is applied to the outside face 56, of course, when a sheet is moved into engagement therewith and suction pulls the sheet against the surface 56 so as to tend to flatten the face 56 and move the center section 60 of the belt inwardly in the direction to open up the slits 62 and 62'. The mechanism for applying pressure to the inside face 55 of the belt B comprises a series of movably mounted roller assemblies 65 (FIGURES 10 to 14) which are spaced longitudinally of the conveyor within the box 25. The roller assemblies 65 are mounted on a longitudinally extending frame assembly supported in depending relation on the top plate 50 of the vacuum box 25. The frame for supporting the roller assemblies 65 and their associated operating or control mechanism comprises a pair of laterally spaced, parallel, vertically disposed side plates 67 and 67' which are adjustably mounted on the top plate 50. Bracket plates 68 and 68' are bolted or otherwise secured to the outside faces of the plates 67 and 67' in longitudinally spaced relation. The bracket plates 68 and 68' have vertically disposed adjusting screws 69 and 69' and vertical bores for receiving hanger bolts 70 and 70' which have their threaded ends engaged in threaded bores provided in the top plate 50 of the suction box 25. The plates 67 and 67' are held in spaced relation laterally by a series of spacer sleeves 71 and bolts 72 which are spaced along the length of the frame. The roller assemblies 65 each comprise a pair of rollers 75 and 75' which are mounted on an eccentric sleeve 76 which is supported for rotation on the shaft 77 extending between the inner faces of the side plates 67 and 67'. The eccentric 76 has a center circular plate portion 80 which forms an operating cam and which has an arm forming pin 81 extending in a generally radial direction for controlling the turning thereof. The cam portion 80 of the eccentric 76 is cut away at 82 (FIGURE 12) on a chordal plane diametrically opposite the operating pin 81 and a generally triangular shaped recess 83 is cut therein which houses a roll 84 mounted on a support pin 85, the latter extending parallel with the axis of the shaft 77. The eccentric 76 is mounted on the shaft 77 so that the weight of the eccentric and the roller assembly 65 tends to cause the eccentric to rotate in a clockwise direction about the shaft 77 as viewed in FIGURES 10 to 12. The advancing movement of the tensioned belt B which in FIGURES 10 to 12 is moving in a direction from left to right urges the roller assembly 65 and eccentric 76 in an upward direction which rotates the same in a counterclockwise direction about the shaft 77. The roller assembly and eccentric is adapted to move between the two positions shown in FIGURES 10 and 11, the belt B being open when this mechanism is in the closed position as shown in FIGURES 10, 12 and 13, and the belt B being open for the application of vacuum through the slits 62 and 62' when the mechanism is in the position shown in FIGURES 11 and 14. In the position shown in FIGURES 10, 12 and 13, the rollers 75 and 75' are in their lowermost position and the cam operating arm 81 has its free end resting against a roller 86 mounted on a spacer sleeve 71 on one of the connecting pins 72 which extend between the vertical frame plates 67 and 67'. The arm 81 is held in this position by a slide assembly 87 which comprises a pair of elongate angle bars 88 and 88' having vertical legs or flange plates connected in parallel spaced relation by a plurality of longitudinally spaced pins and spacer sleeves 89 which extend between the oppositely directed horizontal flanges of the slide bar members 88 and 88'. The slide assembly 87 operates in the space between the vertical side plates 67 and 67' and rides on rollers 90 mounted on the spacer sleeves 71. Keeper bars 91 and 91' are bolted as shown or otherwise attached to the oppositely disposed inside faces of the frame plates 67 and 67'. The pin and spacer sleeve assemblies 89 are spaced the same distance apart in the direction lengthwise of the conveyor unit as the supporting shafts 77 for the eccentrics 76. When the slide bar assembly 87 is moved to the extreme right as shown in FIGURE 10, the control arms 81 for the eccentrics 76 are held in the belt closing position, that is, the vacuum passageways in the belt are closed. When the slide assembly 87 is moved to the extreme left, that is, in the position shown in FIGURE 11, downward pressure on the back face of the belt B is relieved and the slits 62 and 62' are opened to provide vacuum passage through the belt.

Each eccentric 76 has associated with it a locking dog assembly 92 (FIGURES 10 to 13) which comprises a plate-like body member 93 mounted for rotation on a spacer 94 carried on a cross pin 95 between the two vertical plates 67 and 67' of the supporting frame. The shaft 95 is formed by a bolt which extends at opposite ends through the side plates 67 and 67' and also through elongate spacer plates 96 and 96' and carries a pair of rollers 97 and 97' outboard of the side frame plates 67 and 67'. The rollers 97 and 97' are held on the opposite ends of the bolt by bushings 98 and 98'. The head of the bolt 95 is seated in the bushing 98 while the threaded end thereof is engaged in the tapped bushing 98'. The spacer plates 96 and 96' are tapered as shown so as to provide the rollers 97 and 97' with an upward and outward tilt in order to accommodate the inclined surface of the belt B when it is in the open position as in FIGURE 14. The body 93 of the locking dog assembly 92 is provided with pin receiving bores 100 and 101 and pins 102 and 103 are slidably seated in the bores 100 and 101 and urged in an outward direction by compression springs 104 and 105 seated in the inner ends of the bores 100 and 101. The pins 102 and 103 are trapped for limited axial movement in the bores 100 and 101 cross pins 106 and 107 having portions extending into the bores and received in slots 108 and 110 cut in the side walls of the pins 102 and 103. The solt 108 extends to the free end of the pin 102 and a further recess 111 is provided for receiving the roller 84 on the cam 80, the free end of the pin extending into the recess 83 in the cam 80 when the eccentric 76 is in the position shown in FIGURE 12. The slot 110 in the pin 103 limits the movement of the pin 103 in both directions in the bore 101. The free end of pin 103 is adapted to ride on the periphery of the cam 80 and prevents jumping movement of the cam when it turns on the eccentric axis 77. The edge of the dog plate member 93 which confronts the periphery of the cam 80 is recessed on a semi-circle at 112 with the lower end 13 closely adjacent the circular portion 114 of the cam 80 when the cam 80 is in the position shown in FIGURE 12. Upon rotation of the cam 80 after it is released by tilting of the holding dog assembly 92 the cut out portion 82 allows the dog assembly 92 to tilt or swing clockwise (as viewed in FIGURE 12) about its pivot bolt 95 so as to release the next eccentric for rotation. Thus a succession of the eccentrics are permitted to rotate when the first eccentric at the entrance end of the mechanism is rotated counterclockwise as viewed in FIGURE 12 and the first dog assembly 92 is released for clockwise movement. Each successive eccentric 76 when is freed to rotate in a direction to release the next dog in the line with the result that the eccentrics rotate in succession, with a slight delay between the rotation of one eccentric and the next succeeding eccentric.

Figure 16:
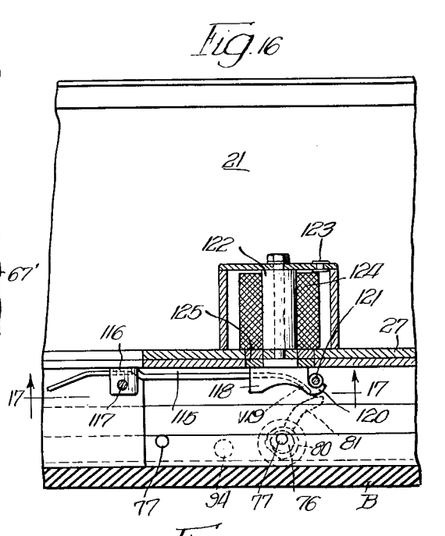
FIGURE 16 is a partial, longitudinal, vertical section taken on the line 16—16 of FIGURE 14, to a smaller scale.
Figure 17:
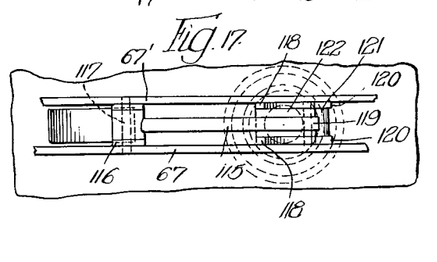
FIGURE 17 is a fragmentary, horizontal section taken on the line 17—17 of FIGURE 16.

One or more mechanisms are provided for locking the operating slide bar assembly 87 against movement. The locking mechanism is positioned and operated to stop the rotation of successive eccentrics beyond a certain point and thereby prevent any further opening of the belt ahead of the point where the mechanism is located. The locking mechanism, as shown in FIGURES 16 and 17, comprises an elongate bar or rod 115 having at one end a U-shaped supporting bracket 116. The bracket 116 has apertured flanges which receive a pivot bolt 117 extending between the frame plates 67 and 67' (FIGURE 17). The bar 115 carries at its other end a channel-shaped bracket 118 and has its free end curved downwardly as shown at 119 between the side flanges of the bracket 118. The forward ends of the flanges of the bracket 118 are cut away to form a hook formation 120 which is adapted to seat under one of the spacers or spreaders 121 extending between the plates 67 and 67'. The plates 20 and 50 above the spreader 121 are apertured to receive the lower end of the pole piece 122 of an electromagnet 123 having a coil 124 and carrying on the lower end of the pole piece 122 a non-magnetic washer assembly 125. When the magnet 123 is energized the bracket 118 is drawn to the uppermost position as shown in FIGURE 16 and the mechanism has no effect on the operation of the eccentrics. When the magnet 123 is deenergized, the bar 115 drops of its own weight and the curved end blocks movement of the arm 81 on the eccentric 76 which is located immediately below the electromagnet 123.

The slide bar assembly 87 is connected at the discharge end of the conveyor to an operating cylinder 130 (FIGURES 5, 6 and 9) which is mounted in an end housing 131 which forms a seal at the end of the vacuum forming box 25. The housing 131 constitutes the end portion of the box 25 and is of the same width as the rest of the box but is increased somewhat in depth to accommodate the slide bar operating mechanism. The box section 131 is closed at the bottom by a bracket 132 of upwardly facing, channel-shaped cross section which carries on its bottom face a slide plate 133 on which the inner surface or back side face of the belt B is adapted to bear and which extends between the ends of the belt edge guide members 52 and 52'. The bracket 132 and the slide plate 133 are both apertured to accommodate a pair of belt supporting rollers 134 and 135 which are mounted on shafts journaled in the upstanding side flanges 136 and 136' (FIGURE 6) of the bracket member 132. The bracket 132 is secured in the end section 131 of the box by connecting it to the horizontal inwardly extending flanges of a pair of angle brackets 137 and 137' which have vertical flanges fastened to the extended side walls 21 and 21' of the box. The cylinder 130 (FIGURES 5, 6 and 9) is supported on end brackets 138 and 138' and its piston 139 carries on its free end a horizontally disposed bracket 140 provided with a pair of laterally spaced, depending pins 141 and 141' for engaging in apertures provided in bracket plates 142 and 142' on the ends of slide members 87 and 87'. The bracket 140 is generally rectangular in shape with its corners beveled as indicated at 143 and 143'. A mechanism is provided for controlling the length of stroke of the piston 138 which mechanism comprises a bracket 145 having a generally rectangular base portion 146 mounted for sliding movement on a pair of keeper rails 147 and 147' secured on the side walls of the box near the upper forward end of the box section 131. The base member 146 of the bracket 145 has depending bumper posts 148 and 148' which are laterally spaced and provided with bumper members 150 and 150' extending vertically of the post and positioned in the path of the bracket 140 so as to engage the beveled surfaces 143 and 143'. Thus by adjusting the position of the bracket member 145 longitudinally of the unit, the length of stroke of the piston 138 and the slide bar assembly 87 is adjusted.

The mechanism for adjusting the longitudinal position of the bracket member 145 comprises a pair of wedge members 151 and 151' which are adjustably connected by a bolt 152 and which are slidingly supported on parallel angle members 153 and 153' extending in a longitudinal direction from the bottom of the base portion 146 of the bracket 145. The base member 146 is provided with tapered forward edge portions 154 and 154' which engage with complementary faces 155 and 155' on the wedge members 151 and 151' so that lateral movement of the wedge members 151 and 151' toward and from each other results in longitudinal movement of the bracket 145.

The vacuum box 25 is closed at the other end of the conveyor rail unit 10 by a seal forming box section 160 (FIGURES 3 and 4) having a bottom closure plate 161 on the lower face of which a slide plate 162 for supporting the belt is mounted. The bottom plate 161 and the slide plate 162 are apertured to receive a belt engaging roller 163 which is rotatably supported on a shaft 164 extending between the side walls 165 and 165' of the box section. An inner vertical cross wall 166 seals off the short section of the box in which the entry roller 163 is mounted.

The entire suction box 25 and its associated elements is secured on the lower side of the main frame 20 by a plurality of clamping devices or assemblies 170, three of which are indicated in FIGURE 1. The clamping assemblies 170 (FIGURES 1, 5, 7 and 8) each comprise a clamp bar member 171 of T-shaped cross section which has a rigidly attached cover or end plate 172 and which is secured by a pair of bolts 173 to the top plate 50 of the suction box 25. The clamp bar 171 extends upwardly through a slot 174 in the bottom wall 22 of the main frame. An aperture 174' in the side wall 21 permits the clamp assembly 170 to be moved laterally into position. The cover plate 172 is bolted or otherwise secured to the side plate 21 with the side portions of the top section of the clamp bar 171 disposed in overlying spaced relation above the bottom frame plate 22. A pair of movable clamp bars 175 and 175' are mounted on opposite sides of the stem forming section of the T-shaped clamp bar 171 and connected to the top or head forming section thereof by pairs of link plates 176. Cap screws 177, 177' are mounted in the cover plate 172 with the free ends engaging the ends of the clamp bars 175 and 175' so that when these screws are taken up the clamp bars 175 and 175' are swung into clamping engagement with the marginal portions of the bottom plate 22 along the edges of the slot 174 in the frame 20 thereby securing the suction box 25 in rigid clamped relation to the frame 20.

The electric eye 16 at the entrance end of the conveyor controls the vacuum applied through the sheet carrying bottom run of the belt B. The electric eye 16 is connected into an operating electrical circuit (not shown) which controls the operating cylinder 130 for the slide bar assembly 87 and also the electromagnet assemblies 123 for the locking bars 115, the latter being located at predetermined points along the length of the conveyor frame 20. The roller carrying cams 76 are normally in the closed position as shown in FIGURE 10. The cylinder 130 operates the slide bar assembly 87 in timed relation to the advancing movement of the leading edge of the sheet and in response to the passage of the sheet as detected by the electric eye 16. The slide bar assembly is moved to the left in FIGURE 10 which releases the arms 81 on the cams 80 for counterclockwise rotation about the pivots 77. However, all of the dogs 92 are in the position shown in FIGURES 10 and 12 where they lock each succeeding cam 80 against rotational movement with each dog 92 being in turn held against rotation except for the first dog at the entrance end of the suction box which is restrained only by engagement of the pin 102 with the roller 84 in the slot 83 of the next succeeding cam member 80. Upon movement of the slide bar assembly 87 to the left the arm 81 on the first cam 80 is freed for rotational movement and the cam 80 is rotated in a counterclockwise direction by the pressure of the belt B on the rollers 75 and 75'. Counterclockwise movement of the first cam 80 frees the next succeeding dog 92 for clockwise movement about its pivot 95 and this in turn frees the next succeeding cam 80 for rotational movement. Thus the cams are freed in succession and the associated eccentrics rotate so as to lift the rollers 75 and 75′ to their upwardly retracted position, which results in the belt B assuming the position shown in FIGURE 14 with the vacuum passageway forming slits 62 and 62′ opening up just ahead of the leading edge of the plate S. As the plate S advances successive cams rotate to allow the passageways in the belt to open and apply suction to the sheet S, assuming that the electromagnets 123 are supplied with current so as to hold the lock bars 115 in non-operative position. The lock bars 115 are spaced longitudinally of the conveyor to divide the belt opening eccentrics into groups. The electromagnets 123 are initially deenergized, permitting the lock bars 115 to drop into locking position where they hold an arm 81 against rotation and thus prevent rotation of any of the cams which are located beyond the same. When it is desired to operate the belt, the electromagnets 123 are energized in timed relation to the advance of the sheet so as to lift the lock bars 115 and release the cams 80 for successive opening movement. When the sheet S has reached the point where it is desired to release it from the belt, the cylinder 130 is operated to retract the slide bar assembly which moves the rollers 88 against the arms 81 and rotates the cams 80 in a clockwise direction to lower the rollers 75 and 75′ against the back surface of the belt B for closing the passageway forming slits 62 and 62′. The resets all of the dogs 92 in their cam locking position.

A modification of the apparatus is illustrated in FIGURES 18 to 21, wherein the roller mounting eccentrics and their associated dog members are replaced by roller carrying assemblies which are mounted in spaced relation along the length of the suction box so as to cooperate with each other in locking and unlocking positions. All other elements of the apparatus are as described with respect to FIGURES 1 to 17 and the description thereof will not be repeated. Elements which have not been changed will be referred to by the same numerals.

Figure 18:
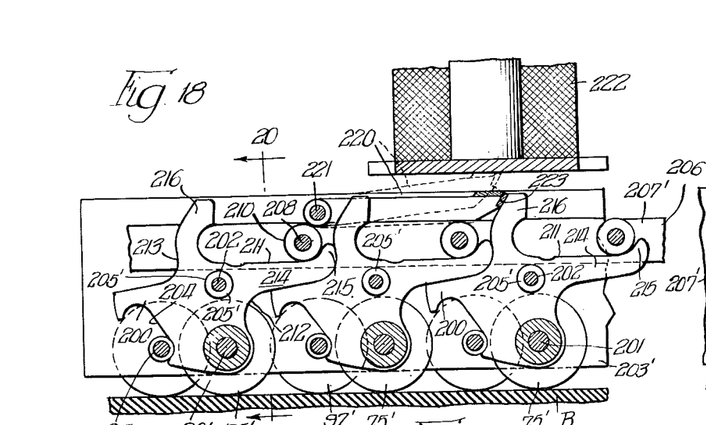
FIGURE 18 is a partial, longitudinal, vertical section similar to FIGURE 10 showing a modified form of belt opening and closing mechanism, the mechanism being in the closed position of the belt.
Figure 19:
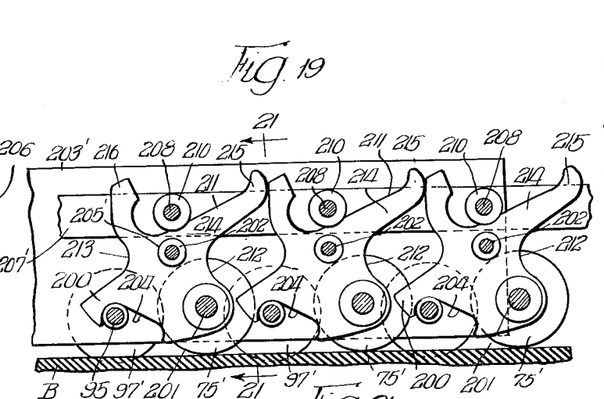
FIGURE 19 is a view similar to FIGURE 18 showing the belt opening and closing mechanism in the open position of the belt.
Figure 20:
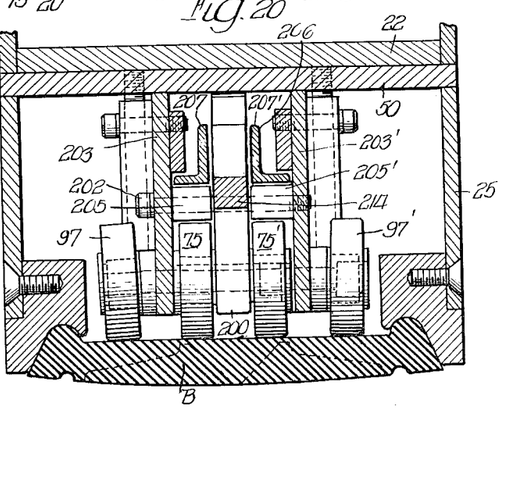
FIGURE 20 is a cross section taken on the line 20—20 of FIGURE 18, to an enlarged scale, and with portions broken away.
Figure 21:
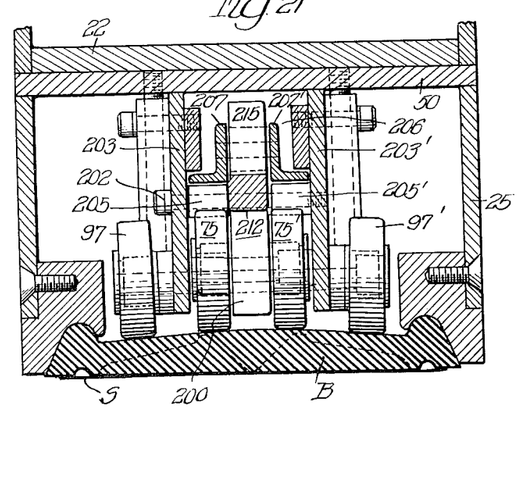
FIGURE 21 is a cross section taken on the line 21—21 of FIGURE 19, to an enlarged scale, and with portions broken away.

Belt controlling rollers 75 and 75′ are rotatably mounted on a pin 201 extending through a plate-like support member 200 which is in turn pivotally supported on a shaft forming pin 202. The roller supporting pin or shaft 201 is located at the lower corner of the plate member 200. The pivot pin 202 for the plate member 200 is approximately in the center of the plate member and extends between the side plates 203 and 203′ of the supporting frame which is mounted within the suction box 25 by suspending the same from the top wall 50 in the same manner as previously described. The plate member 200 has an elongate, open sided slot 204 formed in the lower edge thereof adjacent the rollers 75 and 75′ in which the shaft forming cross member 95 for the outside belt engaging rollers 97 and 97′ is received. The slot 204 is so proportioned that the shaft 95 functions as a limit stop in both directions of rotational movement of the plate member 200. The plate member 200 is provided with laterally extending hub forming portions 205 and 205′ which supports a slide assembly 206 consisting of a pair of angle bars 207 and 207′ arranged with vertical flanges disposed in parallel, spaced, vertical planes and horizontal flanges in oppositely extending relation in a horizontal plane and riding on the hub portions 205 and 205′. The rail members 207 and 207′ are connected by horizontal pins 208 carrying rotatably mounted rollers 210 which are uniformly spaced along the length of the assembly 206 and each of which is received in a slot 211 in the upper side of the plate member 200. The plate member 200 is also cut or formed as shown on the leading and trailing edges thereof at 212 and 213 so as to provide an arm forming portion 214 having a hook shaped leading end 215 and a curved surface along the leading edge 212 which is complementary to the curved middle portion of the surface along the trailing edge 213 of the next succeeding plate member 200 so that the arm 214 seats therein in one position of the plate member as shown in FIGURE 18. The arm 214 is held in the recess in the edge 213 by a roller 210 on the slide bar assembly 206. The slot 211 extends between the arm 214 and an adjoining arm 216 in the counterclockwise direction about the pivot 202 and the length of the slot 211 is such that upon movement of the slide bar assembly 206 to the left as viewed in FIGURE 18 the roller 210 will engage the arm 216 and rotate the plate member in a counterclockwise direction providing the plate member is free to rotate and is not restrained by the arm 214 of the preceding plate member 200. With this arrangement when the slide assembly 206 is in the position shown in FIGURE 18, the rollers 75 and 75′ bear on the back face of the belt B and hold the slits 62 and 62′ in closed condition. When the slide assembly 206 is moved to the left in FIGURE 18, the rollers 210 move towards the arms 216 and allow the plate members 200 to rotate in a counterclockwise direction.

At the start of the operation when the sheet S enters the infeed end of the conveyor the electric eye 16 operates the cylinder 130 controlling the slide bar mechanism 206 and the latter is moved from the position shown in FIGURE 18 to the left. As the slide bar assembly 206 reaches a predetermined point in its movement, the first plate member 200 at the infeed end of the machine is freed to rotate in the counterclockwise direction. This moves the arm 215 of this member out of engagement with the next succeeding plate member 200 and allows the latter to rotate counterclockwise also. Thus each succeeding plate member 200 is freed for rotation in a counterclockwise direction so as to lift the rollers 75 and 75′ off to their retracted position and allow the belt B to open for application of suction to the sheet S. In order to synchronize the operation of the successive roller carrying members they are divided into groups by placing locking levers 220 at predetermined intervals along the length of the conveyor frame. Each of the locking levers 220 is pivoted to the frame plates 203 and 203′ at 221 and is normally held in raised position by an electromagnet 222 which is under the control of a timer or sheet actuated switches (not shown) placed adjacent the same. When the operation is started by the entry of a sheet, the locking levers 220 are raised by activating the electromagnets 222 and each successive group of rollers 75 and 75′ is then allowed to operate in successive timed relation to the movement of the sheet by timing the actuation of the electromagnets to raise the locking levers 220 as the leading edge of the sheet reaches the same. The locking levers 220 have an abutment forming end 223 which is adapted to engage the trailing or back edge of the arm 216 on the plate 200 for holding the same against rotation counterclockwise when the levers are lowered.

The operation of the modified form of the conveyor is the same as in the form previously described with the roller supporting plates 200 being under the control of the slide assembly 206 and the locking levers 220.

While specific materials and particular details of construction have been referred to in describing the apparatus illustrated, it will be understood that other materials and different details of construction may be resorted to within the spirit of the invention.

I claim:
1. An article conveyor comprising an elongate frame, an endless traveling belt assembly which is characterized by being formed of a plurality of relatively narrow, parallel sections in side-by-side relation and operating as an integral unit, spaced end supports on said frame for carrying said belt assembly with the lower face of the lower run of said belt assembly forming an article carrying surface, means forming a vacuum chamber above the lower run of said belt assembly and having a bottom opening, said belt assembly being constructed and arranged beneath said vacuum chamber so that the sections thereof normally form an imperforate closure for said bottom open- ing with one of said sections being adapted to be shifted vertically thereby to expose openings between it and the adjoining belt sections which communicate with the openings in the bottom of the vacuum chamber forming means, a roller assembly support mounted in said vacuum chamber, a plurality of roller assemblies, each of said roller assemblies being mounted on an eccentric on said support so that they normally bear by gravity upon the uppermost face of the belt assembly and hold the shiftable section of the belt assembly against shifting movement, said roller assemblies being yieldable vertically due to their eccentric mounting to permit the shifting of the belt section so as to apply suction to articles as they are fed to the bottom surface of said conveyor, and means mounted between said roller assemblies to hold said roller assemblies so as to prevent vertical movement of each of said roller assemblies until the next preceding roller assembly moves upwardly, said holding means extending between successive rollers in the direction of advance of the belt assembly and means for operating said holding means to release predetermined roller assemblies in sequence by movement of the articles as they are advanced by said belt assembly.

2. An article conveyor comprising an elongate, generally horizontal frame, a downwardly extending housing mounted on said frame and having a bottom opening, means forming a belt guideway in the bottom face of the housing, means connecting the housing with a source of vacuum, a traveling belt assembly having a plurality of belt sections carried on spaced end supports mounted on said frame, said belt sections having their lower runs in adjoining relation in said guideway and their lower faces normally traveling in a transverse plane which is bowed downwardly about a longitudinal center axis, said housing having its bottom opening covered by said belt assembly in the normal arrangement of the belt sections, said belt assembly being so constructed that when one of said belt sections is moved vertically passageways are opened between said belt sections which extend from the bottom face of the conveyor through the belt assembly and the bottom opening into the vacuum chamber forming housing, and a roller assembly mounted within the housing for controlling the movement of the belt sections in a direction normal to the longitudinal axis of the belt, said roller assembly comprising an elongate frame having spaced pairs of belt engaging rollers mounted thereon which in their normal position are urged by gravity against the movable belt section so as to maintain the openings in the belt assembly in closed condition, each pair of said rollers having an operating arm for lifting the rollers, each operating arm in one position locking the next succeeding roller assembly in belt engaging position so that when successive arms are released the next succeeding roller assemblies are free to move to belt releasing position, and a slide bar for engaging the operating arms and holding them in belt depressing position, said slide bar being movable to release the operating arms of the rollers and permit upward movement of the latter due to the pressure of the article on the bottom face of the belt thereby to permit the belt section to be raised by pressure of the article against the bottom face of the belt which opens the passageways for applying suction to the article to hold the article on the belt assembly.

3. An article conveyor as recited in claim 2, and control means for said slide bar which is actuated by passage of a portion of an article being fed to the conveyor prior to engagement of the article with the conveyor belt section.

4. An article conveyor as recited in claim 3, and mechanism for adjusting the stroke of said slide bar so as to vary the timing of the release of the roller operating arms.

5. An article conveyor comprising an elongate, generally horizontal frame, a downwardly extending housing mounted on said frame and having an open bottom, means forming a belt guideway in the bottom face of the housing means connecting the housing with a source of vacuum, a traveling belt assembly having a plurality of parallel belt sections carried on spaced end supports mounted on said frame, said belt sections having their lower runs in adjoining relation in said guideway and their lower faces normally traveling in a transverse plane which is bowed downwardly about a longitudinal center axis, said housing having its bottom face covered in the normal arrangement of the belt sections, said belt assembly being so constructed that when one of said belt sections is moved vertically passageways are opened between said belt sections which extend from the bottom face of the conveyor to the vacuum chamber forming housing, and a roller assembly mounted within the housing for controlling the movement of the belt sections in a direction normal to the longitudinal axis of the belt, said roller assembly comprising an elongate frame having spaced pairs of belt engaging rollers eccentrically mounted thereon so that in their normal position they are held by gravity against one of said belt sections thereby preventing vertical movement and maintaining the openings in the belt assembly in closed condition, each pair of said rollers having an associated operating arm for controlling the eccentric movement of said rollers, a slide bar having means for engaging the operating arms so as to hold them with the rollers in position to depress said one belt section, and pivoted lock elements associated with each of the pairs of belt engaging rollers which are so constructed that upon release of said operating arms by movement of said slide bar successive lock elements will pivot to release the pairs of rollers and permit the belt section to be raised by pressure of the article against the bottom face of the belt thereby opening the passageways through the belt and applying suction to the article to hold the article on the conveyor.

6. An article conveyor comprising an elongate, generally horizontal frame, a downwardly extending housing having an opening in the bottom face mounted on said frame, means forming a belt guideway in the bottom face of the housing, means connecting the housing with a source of vacuum, a traveling belt assembly having a plurality of parallel belt sections carried on spaced end supports mounted on said frame, said belt sections having their lower runs in adjoining relation in said guideway and having downwardly facing portions normally traveling in paths at different elevations, the opening in the bottom face of said housing being covered in the normal arrangement of the belt sections, said belt sections being so constructed that when one of said belt sections is moved vertically passageways are opened between said belt sections which connect the bottom face of the conveyor with the vacuum housing for holding articles on the conveyor, a roller assembly supported in the housing and having longitudinally spaced rollers normally engaging the movable belt section, an eccentrically mounted support for each of said rollers and a control arm extending from each said eccentric support, each control arm in one position engaging the next succeeding roller support and holding it against rotation, a slide bar having means engaging said control arms which slide bar is movable between a position where it holds the control arms so that the rollers are locked in belt engaging relation and a position where the control arms are free to move and allow the movable belt section to be raised by pressure of an article on the bottom face, locking members for holding successive groups of the eccentrically mounted roller supports in a position where the rollers engage the belt, and said locking members being operative to release successive groups of said roller supports as an article is advanced in engagement with the lower surface of said movable belt section.

7. An article conveyor comprising an elongate, generally horizontal frame, a downwardly extending housing having an opening in the bottom face mounted on said frame, means connecting the housing with a source of vacuum, means forming a guideway in the bottom face of the housing, a traveling belt assembly having a plurality of parallel belt sections carried on spaced end supports mounted on said frame, said belt sections having their lower runs in adjoining relation in said guideway and having downwardly facing portions normally traveling in paths at different elevations, the opening in the bottom face of said housing being covered in the normal arrangement of the belt sections, said belt sections being so constructed that when pressure is applied to one of said belt sections sufficient to move it vertically passageways are opened between said belt sections which connect the bottom face of the belt assembly with the vacuum housing for applying vacuum to hold articles on the traveling belt assembly, a roller assembly mounted on an elongate frame which is supported in the housing and having longitudinally spaced rollers disposed for normally engaging the movable belt section, an eccentric mounting on said elongate frame for each of said rollers and a control arm extending from said eccentric in the path of an elongate slide bar on said roller assembly support frame which is movable between a position where the arms are held so that the rollers are in belt engaging relation and a retracted position allowing the movable belt section to be raised and successively operated, electromagnetically controlled locking members for holding successive groups of the eccentrics in a position where the rollers engage the belt and for releasing the eccentrics to permit successive rotational movement of the eccentrics for raising the rollers.

8. An article conveyor comprising an elongate, generally horizontal frame, a downwardly extending housing having an opening in the bottom face mounted on said frame, means forming a belt guideway in the bottom face of the housing, means connecting the housing with a source of vacuum, a traveling belt assembly having a plurality of parallel belt sections carried on spaced end supports mounted on said frame, said belt sections having their lower runs in adjoining relation in said guideway and having downwardy facing portions normally traveling in paths at different elevations, the opening in the bottom face of said housing being covered in the normal arrangement of the belt sections, said belt sections being so constructed that when upward pressure is applied to one of said belt sections sufficient to move it vertically passageways are opened between said belt sections which connect the bottom face of the belt assembly with the vacuum housing for applying vacuum to hold articles on the conveyor, a roller assembly mounted in an elongate frame which is supported in the housing and having longitudinally spaced pairs of rollers normally engaging the movable belt section, an eccentric support for each pair of said rollers and a control arm extending from said eccentric support in the path of an elongate slide bar which is slidable between a position where the rollers are held by the arms in belt engaging relation and a retracted position allowing the movable belt section to be raised, and a plurality of successively operating locking members for holding certain of the eccentrics in a position where the rollers engage the belt and for releasing the eccentrics successively to permit rotational movement of the eccentrics for raising the rollers as an article is advanced in pressure applying engagement with the lower surface of the movable belt section.

9. An article conveyor comprising an elongate, generally horizontal frame, a downwardly extending housing having an opening in the bottom face mounted on said frame, means forming a belt guideway in the bottom face of the housing, means connecting the housing with a source of vacuum, a traveling belt assembly having a plurality of parallel belt sections carried on spaced end supports mounted on said frame, said belt sections having their lower runs in adjoining relation in said guideway and having downwardly facing portions normally traveling in paths at different elevations, the opening in the bottom face of said housing being closed by the belt sections in the normal arrangement thereof, said belt sections being so constructed that when one of said belt sections is moved vertically passageways are opened between said belt sections which connect the bottom face of the conveyor with the vacuum housing for applying vacuum to hold articles on the conveyor, a roller assembly supported in the housing and having an elongate frame and longitudinally spaced rollers carried thereon which normally engage the movable belt section, each of said rollers being mounted on an eccentric support with the roller in one position resting on said movable belt section and a control arm extending from said eccentric in the path of a slide bar which is movable between a position where the arm is held so that the eccentric cannot rotate and the associated roller is held in pressure engaging relation with said movable belt section and a retracted position allowing the eccentric to rotate and the movable belt section to be raised, each said arm in one position engaging the next succeeding eccentric and holding it against movement in a direction to release the pressure of the rollers on the movable belt section, and each said arm being movable out of said eccentric holding position by operation of said slide bar so as to permit successive rotational movement of the eccentrics for raising the rollers as an article is advanced in engagement with the lower surface of the conveyor.

10. An article conveyor as recited in claim 9, and electromagnetically operated lock members for engaging the arms of certain of said eccentrics so as to prevent rotation of the eccentrics in advance thereof.

11. A vacuum belt-type conveyor having an elongate, generally horizontal frame, a vacuum box secured on the bottom of said frame and having a downwardly facing open side, a traveling belt having a bottom run thereof forming a closure for the open bottom side of said vacuum box, and said vacuum box having portions at opposite ends of the conveyor with downwardly facing open bottom sides, belt guide members in said bottom sides which seal off the ends of the vacuum box and belt supporting anti-friction rollers mounted in said belt guide members.

12. An article conveyor comprising an elongate frame adapted to be disposed horizontally, a downwardly facing housing extending along the bottom of said frame and having an opening in the bottom face, a belt guide on the bottom of said housing, a traveling belt assembly supported on end pulleys on said frame and having side portions of the lower run thereof seated in said belt guide beneath said housing, said belt assembly extending across said bottom opening so as to close the same, said belt assembly having a bottom face which is downwardly bowed in the transverse direction and normally closed slits extending between the top and bottom faces which open up upon engagement with the bottom face of an article which flattens said bottom belt face and causes center portions thereof to move upwardly, a mechanism for holding said belt assembly in normal position with said center portions restrained against upward movement, which mechanism comprises an elongate frame supported in said housing, a plurality of longitudinally spaced belt contacting rollers mounted on said frame so as to be vertically movable, and means mounted between successive rollers for holding each succeeding roller in a position to exert pressure on the top face of the belt assembly, and a control device for said roller holding means which operates in response to advancing movement of an article relative to the bottom face of said belt assembly to release certain of said roller holding means in predetermined sequence, each succeeding roller being released for upward movement by release of the associated holding means upon upward movement of the preceding roller whereby to allow upward movement of center portions of the belt as the slits open successively and suction is applied through the belt assembly to hold the article on said bottom face for advance thereof with the belt assembly.

13. A conveyor as recited in claim 11, and end supports for said conveyor frame comprising longitudinally spaced, transversely extending, parallel fixed support members having upwardly facing elongate track formations thereon extending transversely of the conveyor, said conveyor frame having end brackets and anti-friction means in the form of two lengths of chain secured in longitudinally spaced, parallel relation on the bottom faces of said end brackets and said chain having link plates connected by pivot pins and rollers on said pivot pins seated on said track formations whereby to support said conveyor frame for movement in free sliding relation on said transversely extending track formations.

References Cited by the Examiner

UNITED STATES PATENTS

| | | | |
|---|---|---|---|
| 2,733,806 | 2/1956 | Lanier | 198—139 |
| 2,947,429 | 8/1960 | Buccicone | 198—41 |
| 2,973,960 | 3/1961 | Buccicone | 271—74 |

M. HENSON WOOD, Jr., *Primary Examiner.*

ROBERT B. REEVES, *Examiner.*